United States Patent [19]
Vranish

[11] Patent Number: 5,836,701
[45] Date of Patent: Nov. 17, 1998

[54] MECHANICAL SPIN BEARINGS

[75] Inventor: John M. Vranish, Crofton, Md.

[73] Assignee: The United States of America as represented by the Administrator of the National Aeronautics and Space Administration, Washington, D.C.

[21] Appl. No.: 797,507

[22] Filed: Jan. 23, 1997

[51] Int. Cl.⁶ ..................................................... F16C 33/36
[52] U.S. Cl. ............................ 384/565; 384/44; 384/568; 384/569; 384/573
[58] Field of Search ................................ 384/44, 56, 565, 384/568, 548, 550, 569, 618, 619, 571, 573

[56] References Cited

U.S. PATENT DOCUMENTS

| | | | |
|---|---|---|---|
| 1,220,345 | 3/1917 | Koster | 384/571 |
| 2,266,888 | 12/1941 | McCurdy et al. | 384/550 |
| 3,734,584 | 5/1973 | Studer | 384/565 |
| 4,040,689 | 8/1977 | Stanley | 384/550 |

FOREIGN PATENT DOCUMENTS

| | | | |
|---|---|---|---|
| 750031 | 12/1944 | Germany | 384/548 |
| 2908787 | 9/1980 | Germany | 384/568 |
| 1319591 | 6/1973 | United Kingdom | 384/550 |

Primary Examiner—Thomas R. Hannon
Attorney, Agent, or Firm—Keith L. Dixon

[57] ABSTRACT

A spin bearing assembly including, a pair of mutually opposing complementary bearing support members having mutually spaced apart bearing support surfaces which may be, for example, bearing races and a set of spin bearings located therebetween. Each spin bearing includes a pair of end faces, a central rotational axis passing through the end faces, a waist region substantially mid-way between the end faces and having a first thickness dimension, and discrete side surface regions located between the waist region and the end faces and having a second thickness dimension different from the first thickness dimension of the waist region and wherein the side surface regions further have respective curvilinear contact surfaces adapted to provide a plurality of bearing contact points on the bearing support members.

19 Claims, 10 Drawing Sheets

MECHANICAL SPIN BEARINGS

ORIGIN OF THE INVENTION

This invention was made by an employee of the United States Government and, therefore, may be made and used by and for the Government without the payment of any royalties thereon or therefor.

BACKGROUND OF THE INVENTION

This invention relates generally to mechanical bearings and more particularly to three dimensional spin bearings which are capable of providing improved bearing contact surfaces for handling both thrust and radial loads.

Roll bearings for providing relative rotary and linear motion between two mutually opposing bodies are well known and include, among other things, ball bearings, roller bearings, spherical bearings, tapered roller bearings, cross-roller bearings etc. While the load carrying characteristics of these types of bearings are generally known, such elements have their inherent limitations. Nevertheless, there always exists a need for improvements in such devices and particularly those which exhibit superior performance over the known prior art.

SUMMARY

Accordingly, it is an object of the present invention to provide an improvement in mechanical type bearings.

It is another object of the invention to provide an improvement in rolling type bearings.

It is a further object of the invention to provide a new type of rolling bearing which has improved load bearing capabilities.

It is yet another object of the invention to provide a new type of rolling bearing which is termed a spin bearing.

And it is still yet another object of the invention to provide a bearing assembly which includes spin bearings.

The foregoing and other objects are fulfilled by a spin bearing assembly, comprising, inter alia,: first and second complementary bearing support members having mutually spaced apart bearing support surfaces; a set of spin bearings located between the bearing support members; and wherein each of the spin bearings includes a body having a pair of end faces, a central rotational axis passing through the end faces, a waist region substantially mid-way between the end faces and having a first thickness dimension, and first and second discrete side surface regions located between the waist region and the end faces and having a second thickness dimension different from the first thickness dimension of the waist region and wherein the first and second side surface regions further have respective curvilinear contact surfaces adapted to provide a plurality of bearing contact points.

The foregoing and other objects of the invention are also fulfilled by a mechanical spin bearing for both thrust and radial loads located between two mutually adjacent complementary bearing support members, each having respective mutually spaced apart bearing contact surfaces, and comprising: a bearing body having a pair of end faces; a central rotational axis passing through the end faces; a waist region substantially mid-way between the end faces and having a first thickness dimension; and first and second discrete side surface regions between the waist region and the end faces and having a second thickness dimension different from the first thickness dimension, the first and second side surface regions further having respective contact surfaces adapted to provide a plurality of bearing contact points.

The foregoing and other objects are further fulfilled by a mechanical spin bearing race assembly, comprising: first and second mutually adjacent complementary body members wherein each of the body members includes a bearing contact surface; and wherein the bearing contact surfaces comprise mutually spaced apart and opposing convex bearing contact surfaces.

Further scope of applicability of the present invention will become apparent from the detailed description provided hereinafter. However, it should be understood that the detailed description and specific examples, while indicating preferred embodiments of the invention, are provided by way of illustration only, since various changes, alterations, modifications, coming within the spirit and scope of the invention will become apparent to those skilled in the art from the detailed description.

BRIEF DESCRIPTION OF THE DRAWINGS

The present invention will become more fully understood when considered together with the accompanying drawings which are given by way of illustration only, and thus are not limitative of the invention, and wherein.

DETAILED DESCRIPTION OF THE INVENTION

Figure 1:
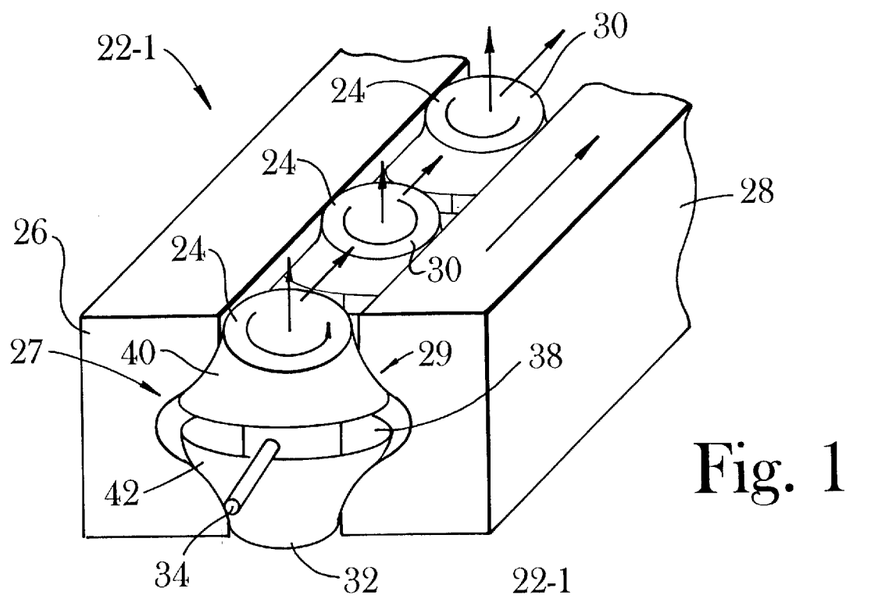
FIG. 1 is a perspective view generally illustrative of a concave spin bearing assembly.

Referring now to the drawings and more particularly to FIG. 1, shown thereat is a perspective view of a first embodiment of the invention which comprises a spin bearing assembly 22-1 consisting of a plurality of concave spin bearings 24 located in a circular race comprised of an annular outer race 26 and a complementary annular inner race 28 having mutually spaced apart bearing support surfaces 27 and 29 and where the inner race 28 is shown rotating in a clockwise direction relative to the outer race 26, causing the spin bearings 24 to rotate in a counterclockwise direction about a central rotational Z axis which passes through a pair of end faces 30 and 32. A bearing carrier spring 34 separates the spin bearing 24 from each other by partially encircling an inner portion 36 of a waist region 38. Each concave spin bearing 24 includes a pair of outer bearing regions 40 and 42, which are relatively narrower in thickness than the intermediate waist region 38.

Figure 2:
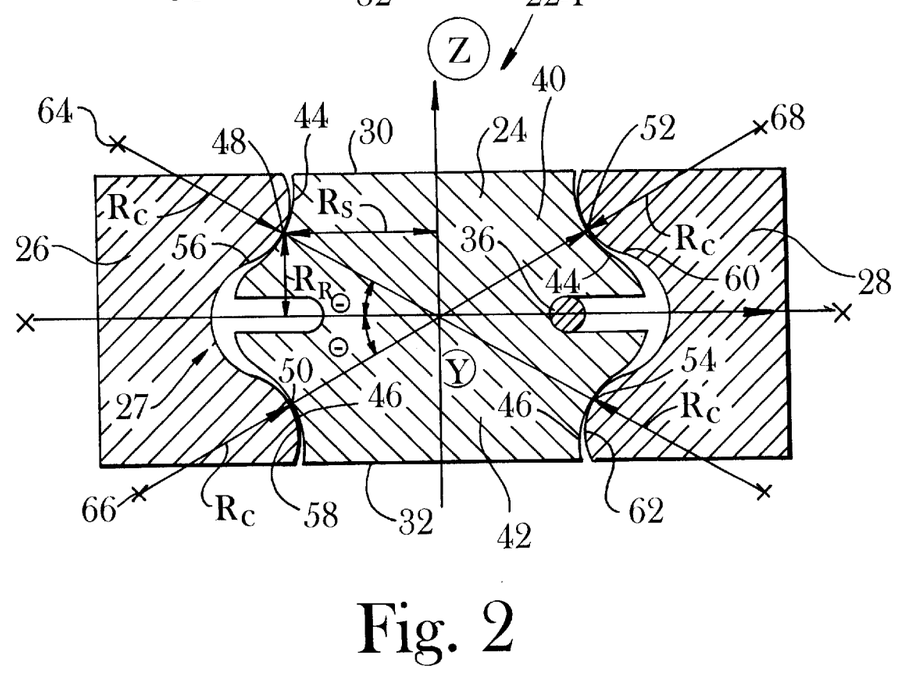
FIG. 2 is a lateral cross section of the concave spin bearing assembly shown in FIG. 1.

As further shown in FIG. 2, the outer regions 40 and 42 of each concave spin bearing 24 include respective concave contact surfaces 44 and 46 which are adapted to provide four bearing contact points 48, 50, and 52, 54 between convex contact surfaces 56 and 58 of the outside bearing surface 27 and the convex contact surfaces 60 and 62 of the inside bearing surface 29. Each concave spin bearing 24, moreover, has a spin radius $R_s$ which extends from the Z axis to the contact four points as shown, for example, to the contact point 48 which exists between the concave surface 44 of the spin bearing 24 and the convex surface 56 of the outer race 26. The designation $R_r$ signifies the roll radius about the X axis which extends from the contact surfaces, and the contact points, e.g. contact point 48, to the X axis. There are also four contact radii $R_c$ which have centers 64, 66, 68 and 70 which are located outside of the bearing races 26 and 28. It should also be noted that $R_c$ is not perpendicular or normal to the axis of rotation, i.e. the Z axis, but is at an angle $\theta < 90°$ with respect to the X axis. In ball and roller bearings, the opposite normally holds true. Additionally, $R_c$ is typically greater than $R_s$ for concave spin bearings. Stated another way, the geometry of a concave spin bearing permits a very small spin radius $R_s$ to co-exist with a very large contact radius $R_c$. This results in reducing contact stresses for compact bearings.

It is intuitively obvious that a concave spin bearing 24 as shown in FIG. 2 is stable and self-aligning about the Z and Y axes for both radial and axial loads; however, it can be demonstrated that the concave spin bearing is also stable against tumbling or spinning about the X axis even though it could be constrained, if need be, by any carrier member, e.g. the spring 34 shown in FIG. 1 partially encircling the waist region 38.

Figure 3:
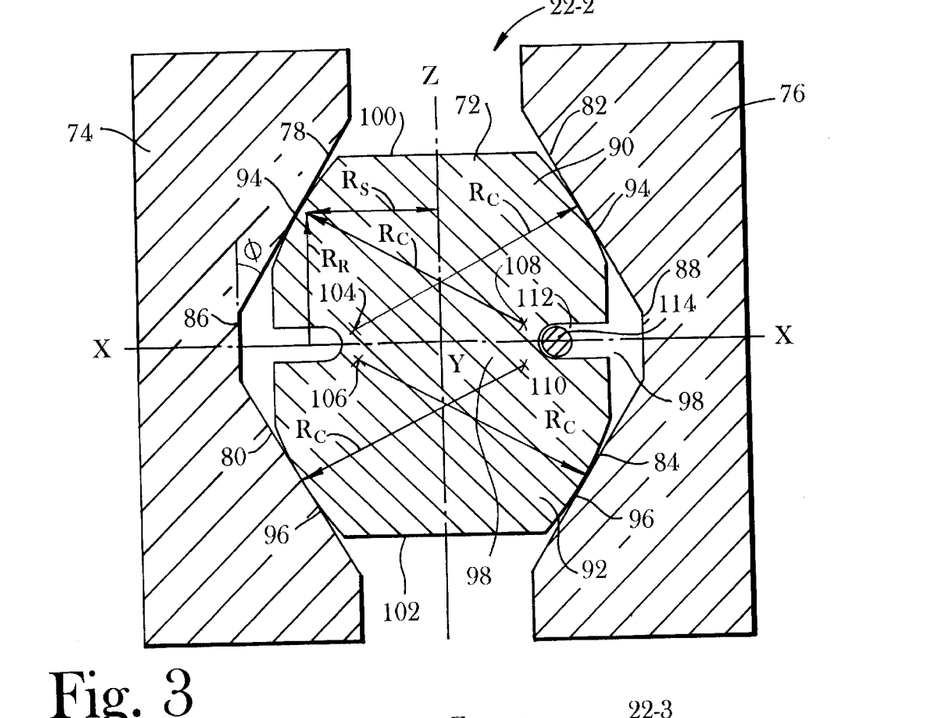
FIG. 3 is a lateral cross section of a convex spin bearing assembly in accordance with the subject invention.

Considering now FIG. 3, shown thereat in a transverse cross-sectional view is a second embodiment of the invention comprising a convex spin bearing structure 22-2 and which includes a convex spin bearing 72 located between concave outer and inner races 74 and 76 having linear bearing contact surfaces 78, 80 and 82, 84 which are angulated at an angle $\phi$ relative to the pair of flat intermediate faces 86 and 88. As shown, the convex spin bearing 72 includes outer bearing regions 90 and 92, which include convex peripheral faces 94 and 96, an intermediate a waist region 98 and a pair of end faces 100 and 102.

As before, the convex bearing 72 as shown in FIG. 3, includes contact radii $R_c$ which are greater than the spin radius $R_s$; however, the centers thereof as shown by reference numerals 104, 106, 108 and 110 lie inside the bearing structure 22-2 as opposed to being outside the bearing structure 22-1 as shown with respect to the concave bearing in FIG. 2. Also, the convex spin bearing 72 includes an annular slot 112 in the waist region 98 for the passage of a carrier spring member 114.

While the convex spin bearing 72 shown in FIG. 3 is stable about the Z and Y axes, it can be seen that such a spin bearing could be unstable about the X axis, depending upon the particular design and the specific dimensions. However, this can be solved simply by utilizing a carrier member 114 as shown, even though the tendency to tumble about the X axis would be lessened by making the linear contact faces 78, 80, 82 and 84 of the races 74 and 76 concave faces. Conversely, instability would be enhanced if the surfaces 78, 80, 82 and 84 were convex so that a convex on convex contact exists.

Figure 4:
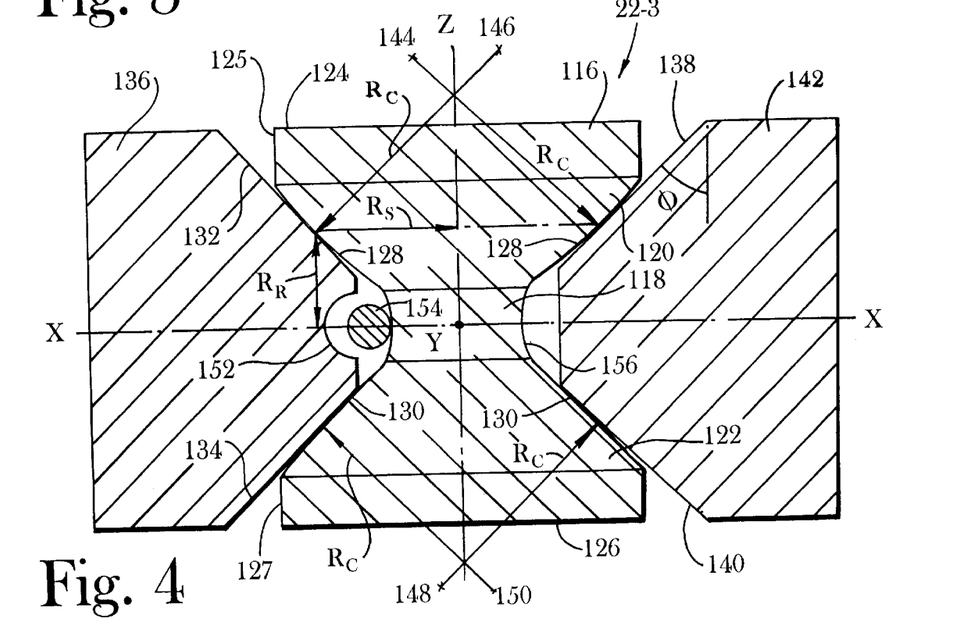
FIG. 4 is an hour glass spin bearing assembly in accordance with the subject invention.

Attention is now directed to FIG. 4. Shown thereat is an hour-glass type of spin bearing assembly 22-3 which forms a third embodiment of the invention. This structure now includes a spin bearing 116 having a waist region 118 which has a narrower thickness dimension than the adjoining outer regions 120 and 122 adjacent a pair of end faces 124 and 126 and a pair of flat rim surfaces 125 and 127. The outer regions 120 and 122 include convex peripheral contact surfaces 128 and 130 which contact the faces 132 and 134 of an outer race 136 and the faces 138 and 140 of an inner race 142. Four contact radii $R_c$ are thus defined and having centers 144, 146, 148 and 150. These centers lie outside of the bearing assembly 22-3 and pairs of contact radii $R_c$ on either side of the waist region 118 intersect the Z axis. Whereas the first two embodiments of spin bearing assemblies 22-1 and 22-2 included a carrier spring slot in the body of the bearing, the hour-glass configuration of the spin bearing shown in FIG. 4 now includes a slot 152 in the outer race 136 to accommodate a carrier spring 154 which is also adapted to reside on the outer surface 156 of the waist region 118.

Such a configuration is inherently stable about all three axes (X, Y and Z), while operating as both thrust and radial bearings. Thus any force applied, for example, to the upper region 120, will be immediately countered by an opposing reactive force in the lower region 122, with the Y axis and the X axis acting as a fulcrum.

Having thus considered three different types of spin bearings, i.e. concave, convex and hour-glass spin bearings, two embodiments of a compound spin bearing will now be considered.

Figure 5:
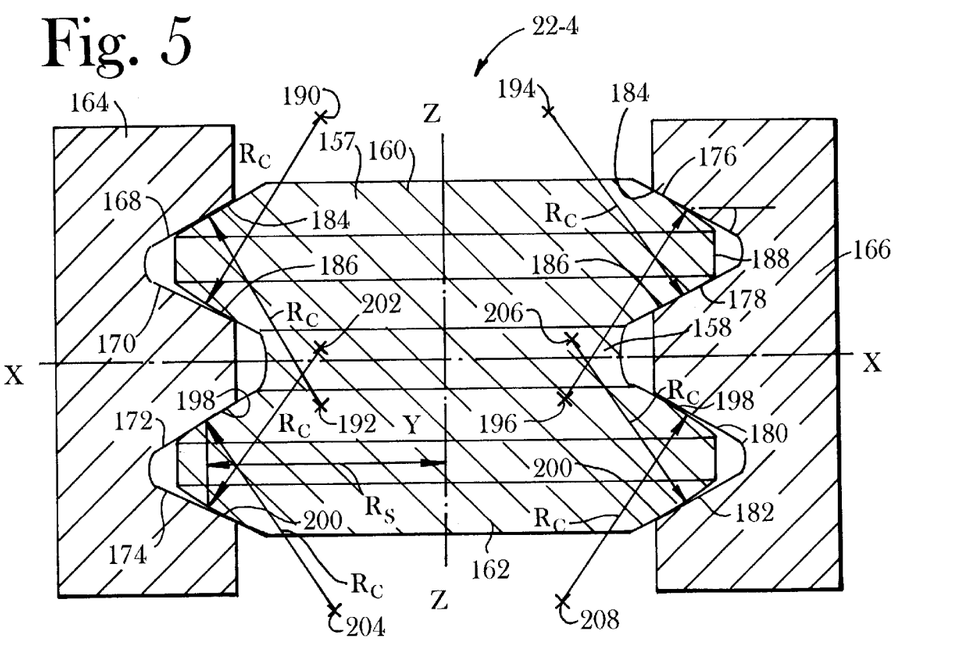
FIG. 5 is a lateral cross section of a convex compound spin bearing assembly in accordance with the subject invention.

With respect to the bearing configuration 22-4 shown in FIG. 5, it depicts a convex compound bearing assembly that includes a hybrid spin bearing 157 incorporating features of both the convex spin bearing 72 shown in FIG. 3, and the hour-glass spin bearing 116 shown in FIG. 4. The compound spin bearing 157 of FIG. 5 resembles the hour-glass version of the spin bearing in that it includes a relatively narrow waist region 158 which connects a pair of convex spin bearing members 160 and 162 together, and which are shown residing, for example, in a pair of complementary races 164 and 166, each having two pairs of mutually spaced apart bearing support surfaces. For example, race 164 includes bearing surfaces 168, 170 and 172, 174 while race 166 includes contact surfaces, 176, 178, and 180, 182. The upper convex spin bearing member 160, moreover, includes a pair of convex arcuate peripheral contact surfaces 184 and 186 which are separated by a rim surface 188. The two convex surfaces 184 and 186, moreover, define four contact surface radii $R_c$ having centers 190, 192, 194 and 196, which typically lie both within and outside the bearing 157. In a like manner, the lower convex spin bearing member 162 includes a pair of convex arcuate peripheral contact surfaces 198 and 200 which are separated by a second rim surface 201 and which define a second set of four contact radii $R_c$ having centers 202, 204, 206 and 208 which also typically lie within and without the bearing 157. If $R_c$ is extremely large, the centers 192, 196, 202 and 206 will lie outside the spin bearing 157.

In the assembly shown in FIG. 5, the magnitude of the contact radius $R_c$ should be made relatively large in relation to that of the spin radius $R_s$ in order to reduce contact stresses. It can be seen that although in the other embodiments of the spin bearing, $R_c$ is generally greater than $R_s$. Such a relationship need not be maintained here because the spin bearing when located between the races 164 and 166 becomes inherently stable about the three X, Y and Z axes.

Figure 6:
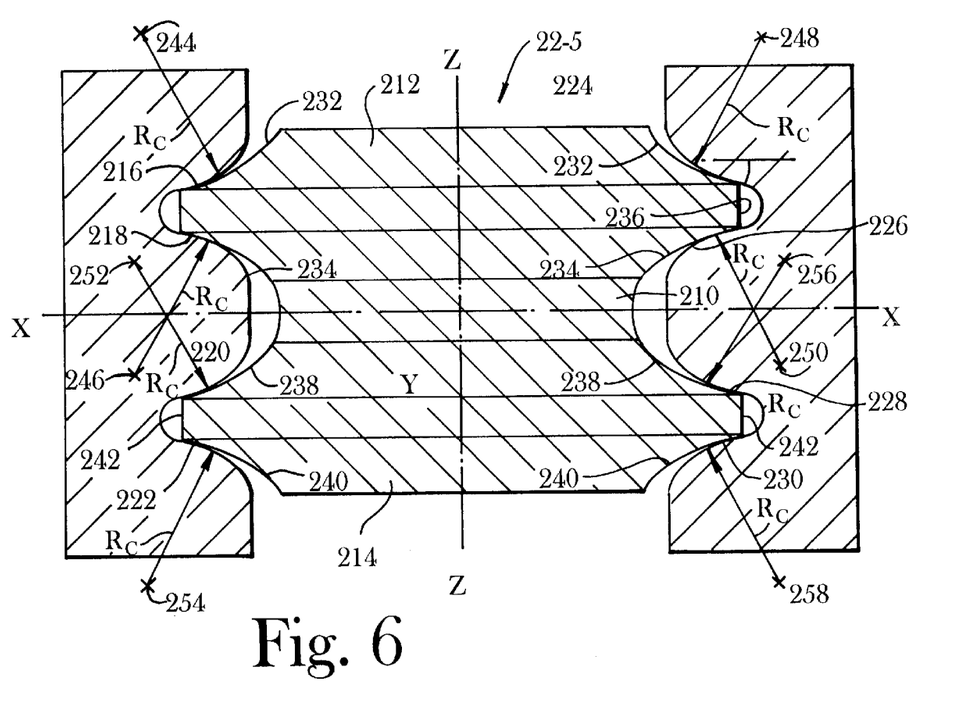
FIG. 6 is a concave compound spin bearing assembly in accordance with the subject invention.

Considering the embodiment depicted in FIG. 6, shown thereat is a concave compound spin bearing assembly 22-5. The primary difference between this structure and that of the bearing assembly 22-4 shown in FIG. 5 is the shape of the bearing and race contact surfaces. As shown in FIG. 6, a relatively narrow waist region 210 separates upper and lower concave spin bearing members 212 and 214 located between a pair of races 216 and 218, each respectively having two pairs of convex contact surfaces 216, 218 and 220, 222 and 224, 226 and 228, 230.

The upper bearing member 212 includes two concave peripheral bearing surfaces 232 and 234 separated by an intermediate section having a rim surface 236. The lower bearing member 214 likewise includes a pair of concave peripheral bearing surfaces 238 and 240, separated by a second intermediate section also having a flat peripheral surface 242. Now, however, four contact surface radii $R_c$ having centers 244, 246, 248 and 250 are provided which diverge outwardly, as opposed to that shown in FIG. 5. Similarly, the lower spin bearing member 214 includes four contact surface radii $R_c$ having centers 252, 254, 256 and 258, which also diverge outwardly from the bearing. The stability about the X, Y and Z axes is, again, inherent in such a configuration. Stability of the compound bearings as shown in FIGS. 5 and 6, can further be demonstrated by reference to FIGS. 7 and 8, which depict the forces acting, for example, on a convex compound spin bearing such as shown in FIG. 5.

Figure 7:
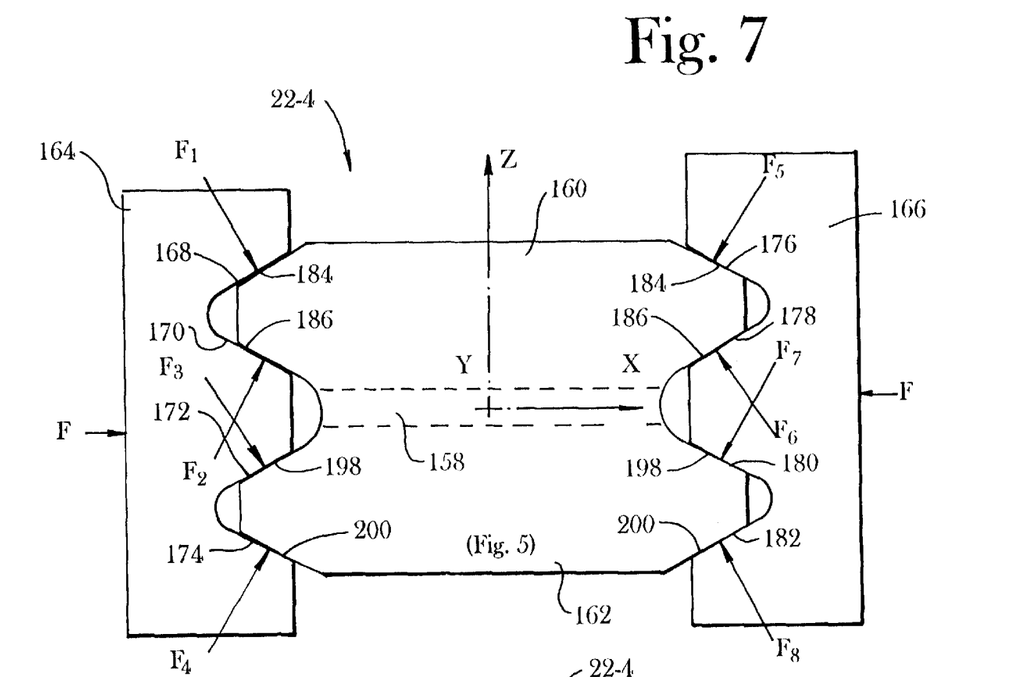
FIG. 7 is a diagram illustrative of the thrust bearing forces which exist in a compound bearing assembly shown in FIG. 5.

As depicted in FIG. 7, a thrust force F applied on the race 164 parallel to the X axis will cause inward forces $F_1$, $F_2$, $F_3$ and $F_4$ to be applied inwardly via the angulated faces 168, 170, 172 and 174, while a force F exerted on the race 166 causes inward forces $F_5$, $F_6$, $F_7$ and $F_8$, to be applied via the angulated faces 176, 178, 180 and 182.

Figure 8:
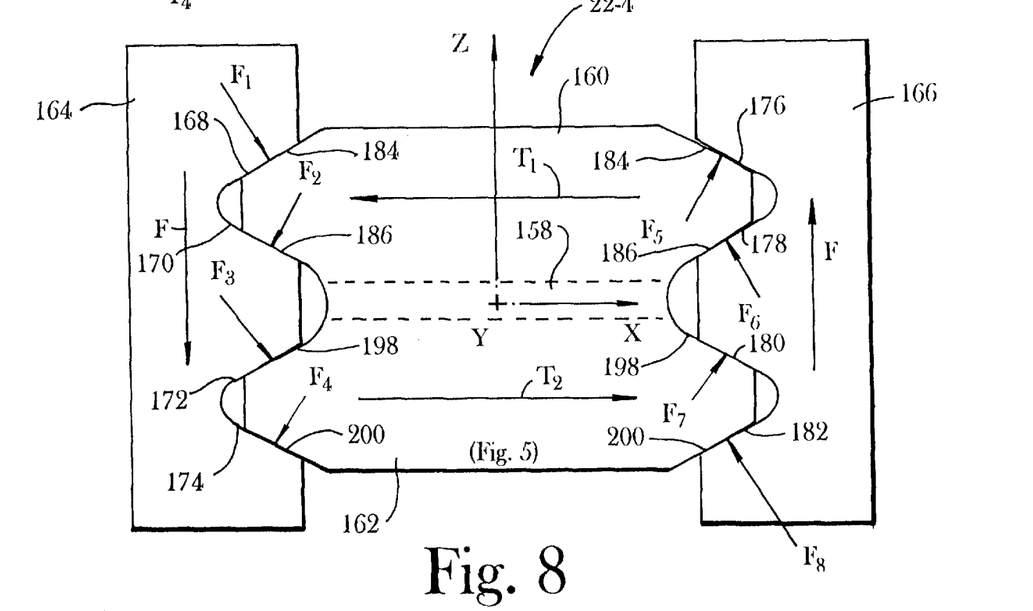
FIG. 8 is a diagram illustrative of the torsion forces existing in a compound bearing assembly shown in FIG. 5.

Insofar as axial forces are concerned, which would result from motion of either of the races 164 and 166, parallel to the Z axis, a downward force F as shown in FIG. 8 exerted on the race 164, causes inwardly applied forces $F_1$ and $F_3$ to be applied to the faces 168 and 172 with outwardly directed reactionary forces $F_2$ and $F_4$ being applied to the faces 170 and 174 via the peripheral bearing contact surfaces 186 and 200. An upward force F exerted for example on the opposite race 166 would cause inwardly directed forces $F_6$ and $F_8$ to be applied to the surfaces 178 and 182 with outward reactionary forces being applied to the surfaces 176 and 180 via the peripheral convex bearing surfaces 184 and 198. These forces are also accompanied by torques $T_1$ and $T_2$ about the Y axis. It can be seen that inherent bearing stability exists for both trust and radial forces which might be encountered.

Figure 9:
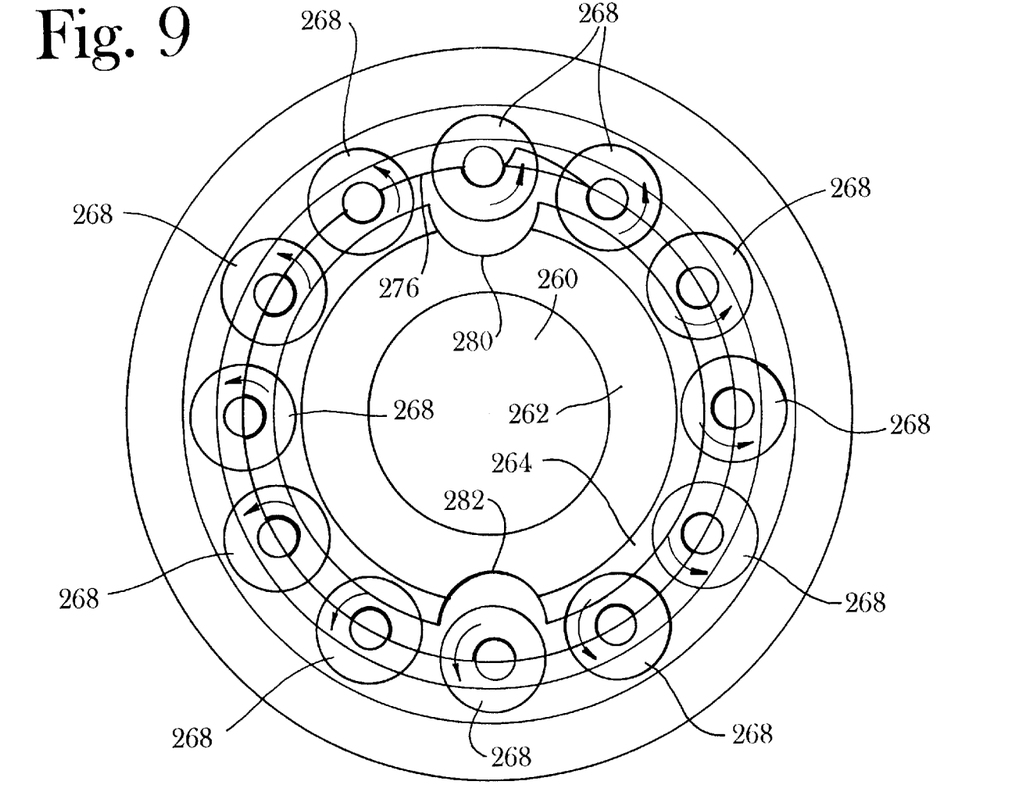
FIG. 9 is a plan view of a circular bearing assembly including a set of spin bearings.
Figure 10:
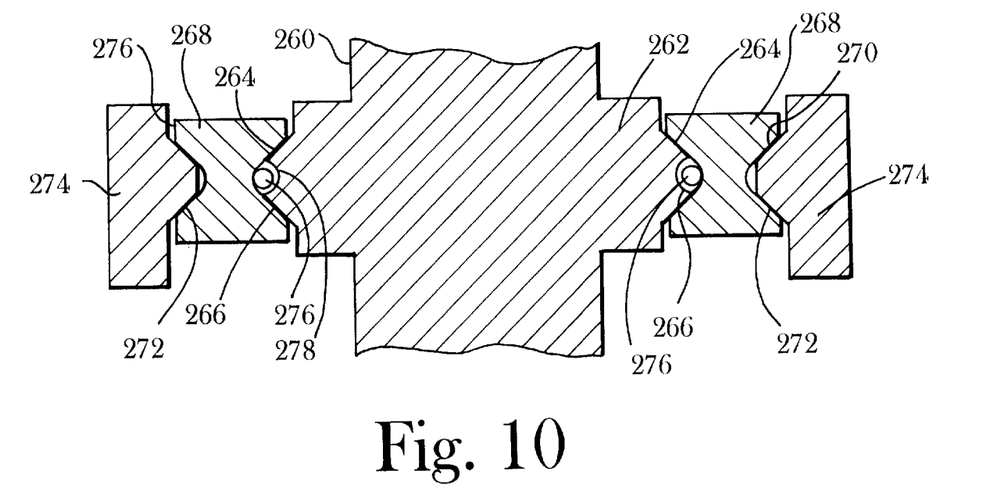
FIG. 10 is a central cross section of the bearing assembly shown in FIG. 9 and being illustrative of a set of hour glass spin bearings located therein.

Having thus described the preferred embodiments of spin bearings in accordance with this invention, reference will now be made to FIGS. 9 through 20. FIGS. 9 and 10, for example, are intended to show a relatively simple circular spin bearing system including a rotatable drive shaft 260 which includes an enlarged diameter race portion 262 having a pair of inclined bearing faces 264 and 266 for receiving a set of hour-glass spin bearings 268 which are also in contact with the bearing faces 270 and 272 of an outer race comprised of a reaction ring member 274.

A carrier spring member 276 positioned in a carrier access slot 278 formed in the inner race 262 of the drive member 260 keeps the spin bearings 268 mutually separated from one another and biased outwardly from the drive shaft 260. Two semicircular openings 280 and 282 are shown in FIG. 9 formed in the inner race portion 262 and comprise bearing assembly slots for the hour-glass spin bearings 268. Thus when outer reaction ring 274 remains fixed, the drive shaft 260 can spin within the reaction ring 274, such that if the drive shaft 260 is rotated in a clockwise direction as shown in FIG. 9, the hour-glass spin bearings 268 will rotate in a counterclockwise direction.

Figure 11:
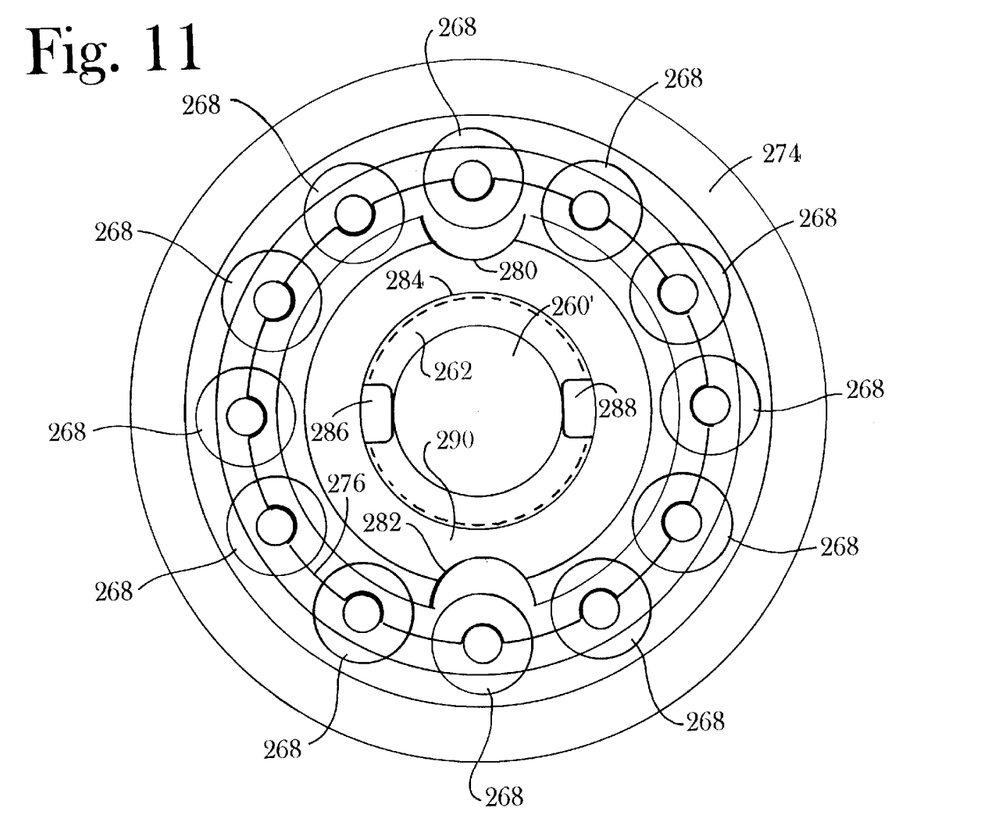
FIG. 11 is a modification of the circular bearing assembly shown in FIG. 9 and including a preload assembly.
Figure 12:
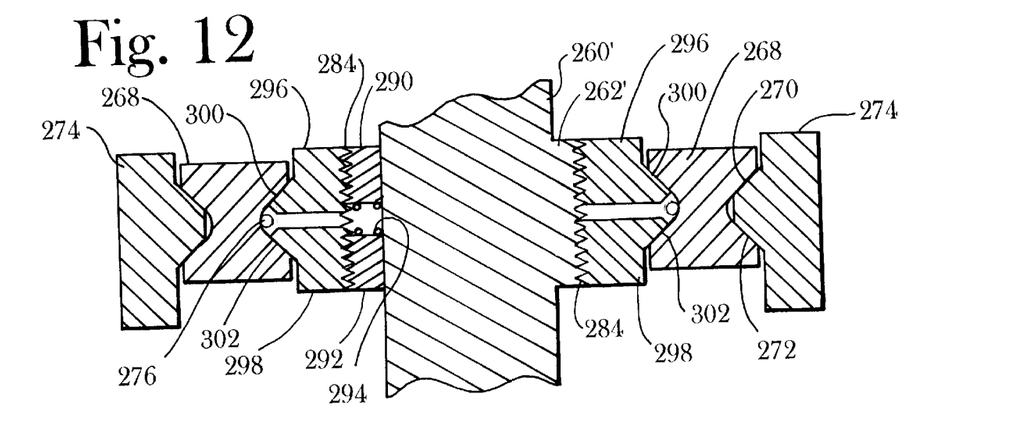
FIG. 12 is a central longitudinal cross section of the bearing assembly shown in FIG. 1 and being further illustrative of the preload assembly included thereon.

The configuration shown in FIGS. 11 and 12 is intended to show an axial preload scheme for an hour-glass bearing system such as shown in FIGS. 11 and 12 and is essentially the same as that shown therein with the exception that the center drive portion is modified so that the drive shaft which is shown now by reference No. 260' includes a relatively larger diameter race portion 262' which is both threaded, as shown by the threads 284, and two access ways 286 and 288 are provided for the insertion of one or more upper and lower preload shims 290 and 292 (FIG. 12) having a preload shim spring 94 located therebetween. Additionally, a pair of preload rings 296 and 298 respectively including bearing faces 300 and 302 are screwed onto the threads 84 to provide an outwardly biasing force against the hour-glass spin bearings 268. Also, the faces 300 and 302 are shaped to accept a carrier spring member 276 as before.

Figure 13:
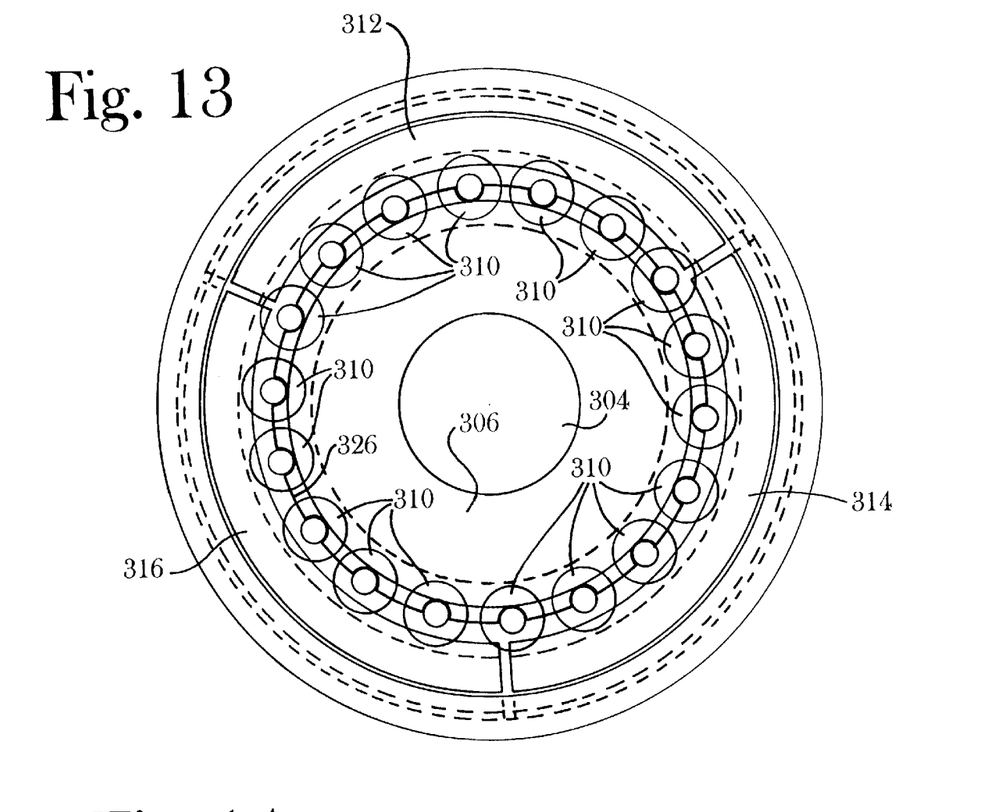
FIG. 13 is a top plan view illustrative of a circular bearing assembly including an outside collette type preload scheme in accordance with this invention.
Figure 14:
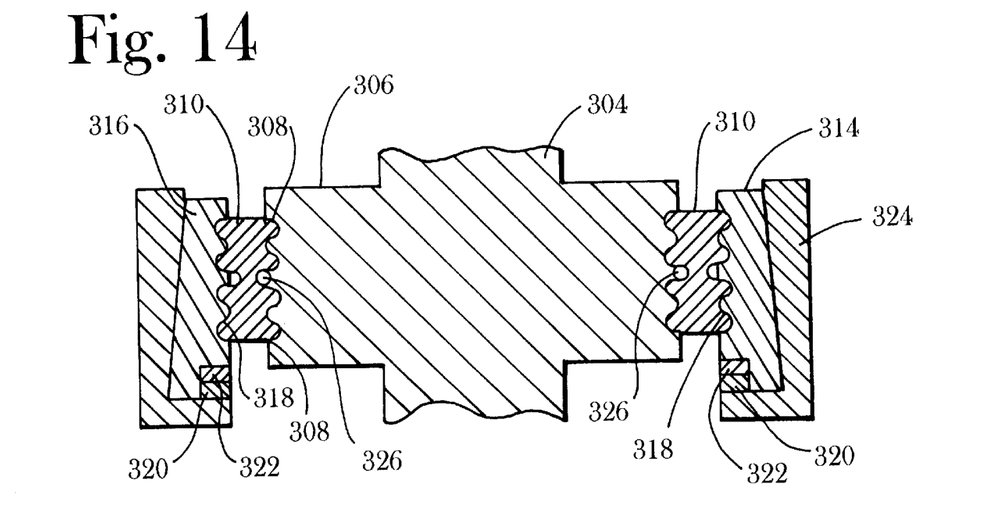
FIG. 14 is a transverse cross section diagram being further illustrative of the assembly shown in FIG. 13 and including a set of compound spin bearings.

Referring now to FIGS. 13 and 14, shown thereat is a compound spring bearing system where preloading is accomplished by means of collette type of an arrangement. As shown, the system includes a center drive element consisting of a shaft 304 having an enlarged diameter region 306 including a plurality of bearing faces 308 for accepting a set of compound bearings shown by reference number 310 which oppose three annular collette members which include a set of bearing faces 318 which match the bearing faces 308 of the shaft 304 so that the compound bearing members 310 can rotate. Spacing and preloading forces are applied by a preload spring member 320 and a washer 322. The collette members 312, 314, 316 and the underlying preload spring 318 and washer 320 are further held in place by a reaction ring member 324. As before, as spin is imparted to the shaft 304, spin bearings 310 will rotate in opposite direction relative to the reaction ring member 324 while being held in place by a carrier spring 326.

Figure 15:
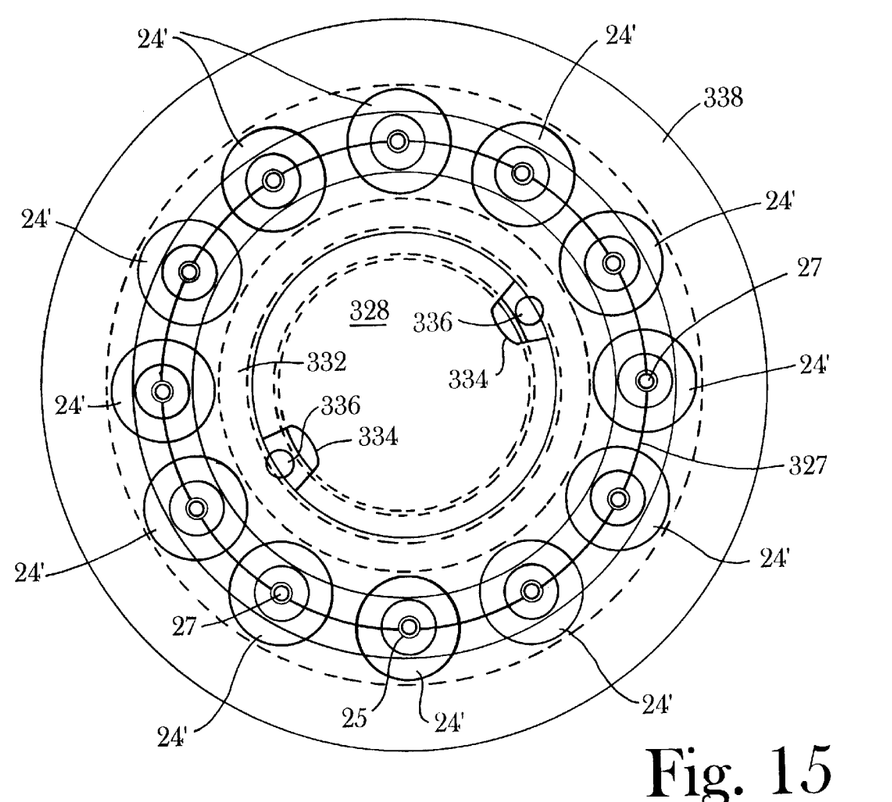
FIG. 15 is a top plan view of a circular bearing assembly utilizing a set of preload rings along with a set of compound spin bearings.
Figure 16:
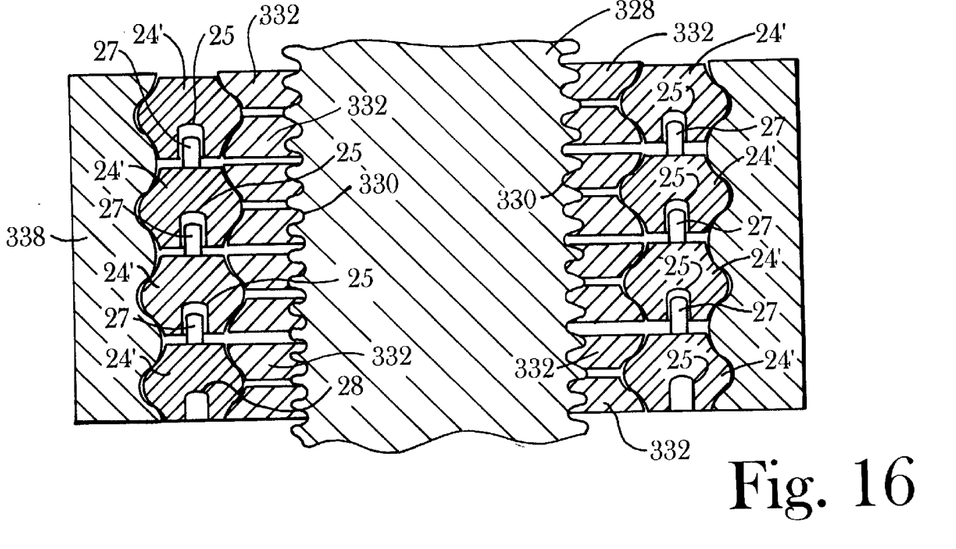
FIG. 16 is a longitudinal cross section illustrative of the bearing assembly shown in FIG. 15 and being further illustrative of the preload rings and the compound bearings included therein.

Turning attention now to FIGS. 15 and 16, shown thereat is another configuration of a compound spin bearing system which is comprised of a plurality of stacked concave spin bearings 24 such as shown in FIG. 2, and which are designated by reference No. 24' inasmuch as each spin bearing 24' now includes an axial bore 25 for receiving a respective spindle 27 of a carrier 327 (FIG. 15). The set of concave spin bearings 24' are caged between a reaction ring 338 and a center drive shaft member 328 including a set of threads 330 formed on a section thereof for receiving thereon sets of preload rings 332 which provide bias contact surfaces for the spin bearings 24'. A pair of access ways 334 are formed in the shaft 328 for receiving a pair of preload springs 336, as shown in FIG. 15.

Figure 17:
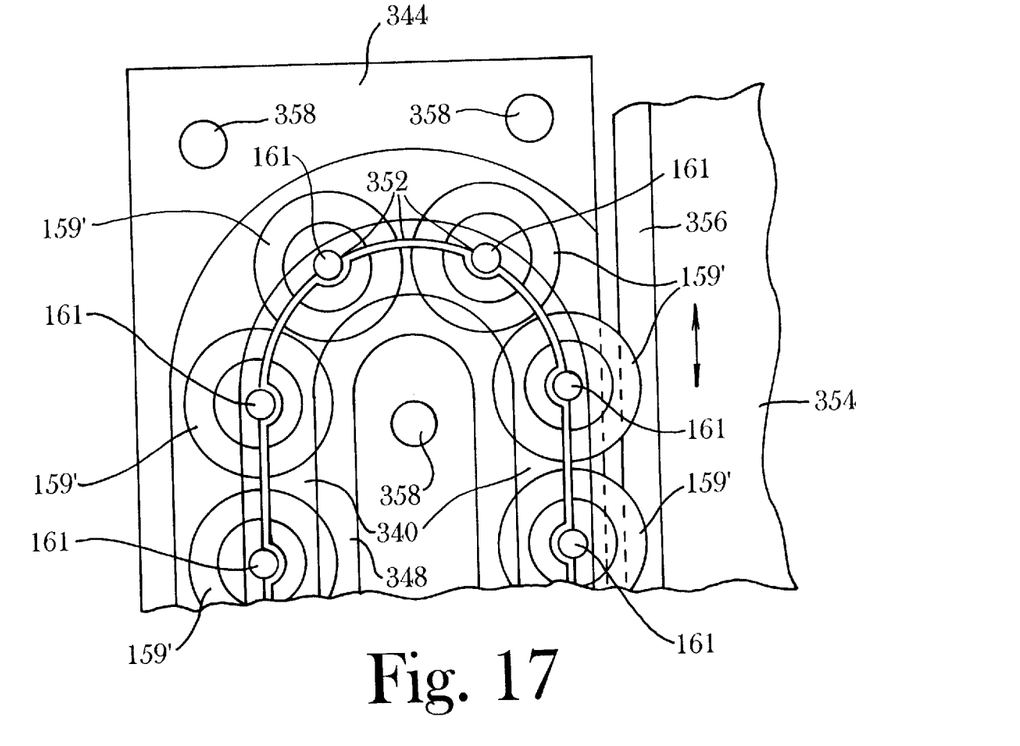
FIG. 17 is a top plan view illustrative of a linear slide including a recirculating spin bearing assembly.
Figure 18:
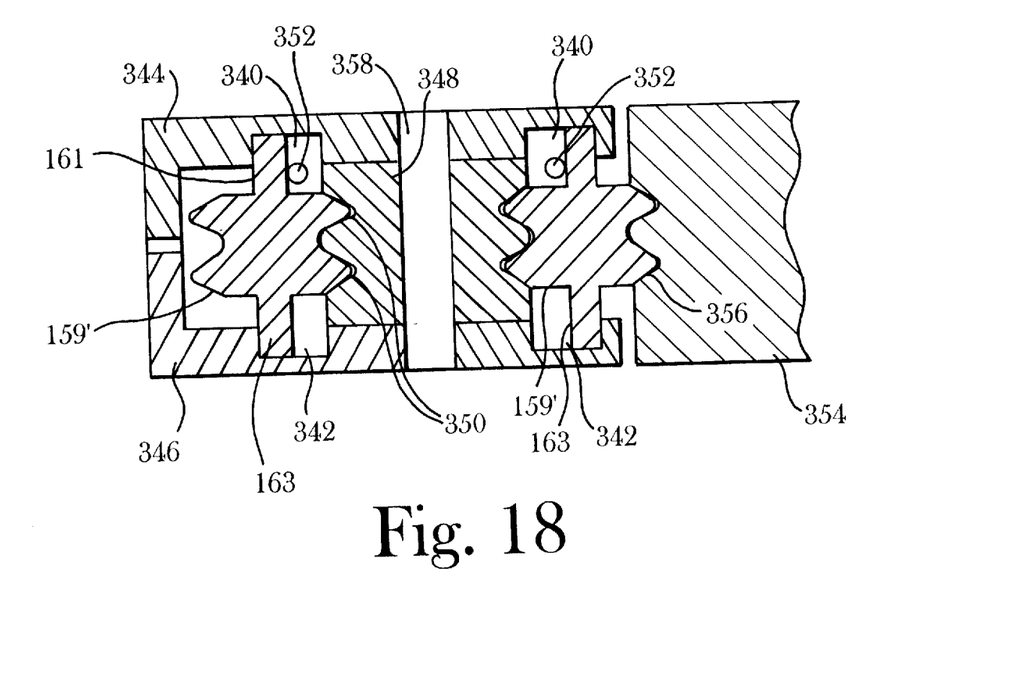
FIG. 18 is a longitudinal cross section of the linear slide assembly shown in FIG. 17.

Next, a pair of linear slide assemblies will be considered. FIGS. 17 and 18, for example, disclose a linear slide which include a set of recirculating spin bearings, while FIGS. 19 and 20 disclose a linear slide including non-recirculating spin bearings.

With respect to the configuration of FIGS. 17 and 18, shown thereat is a set of convex compound spin bearings 159' similar to the compound spin bearing 159 shown in FIG. 5, with the exception that now a pair of spindles 161 and 163 project from their upper and lower ends so as to fit into and engage the outer side walls of recessed tracks 340 and 342 formed in upper and lower frame members 344 and 346 which adjoin an inner frame member 348, the latter including a plurality of bearing surfaces 350 for engaging the convex bearing surfaces of the spin bearings 159'. Reference number 352 denotes a carrier spring member which engages the upper spindle 161 of the spin bearings 159. A linear slide member 354 is shown located adjacent the frame members 344 and 346. The slide member 354 includes plural spin bearing surfaces 356 for engaging the convex bearing surfaces 350 of the compound spin bearings 159'. Accordingly, the linear slide member 354 is adapted to translate linearly in either direction relative to the frame members 344 and 346. Reference number 358 denotes a plurality of mounting holes, one of which is shown in cross-section in FIG. 18.

Figure 19:
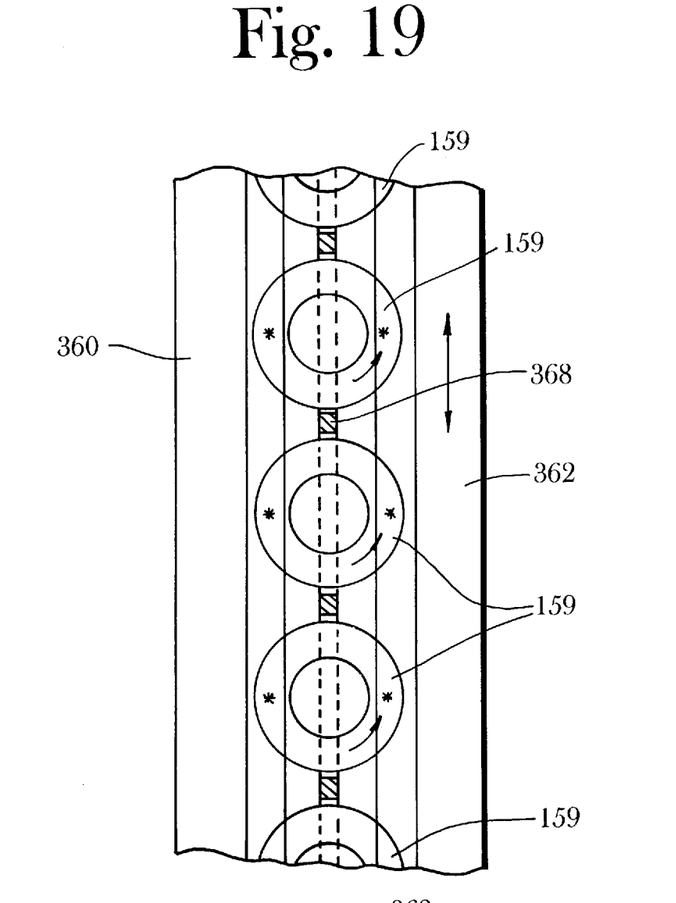
FIG. 19 is a top plan view illustrative of a linear slide assembly including a non-circulating spin bearing assembly.
Figure 20:
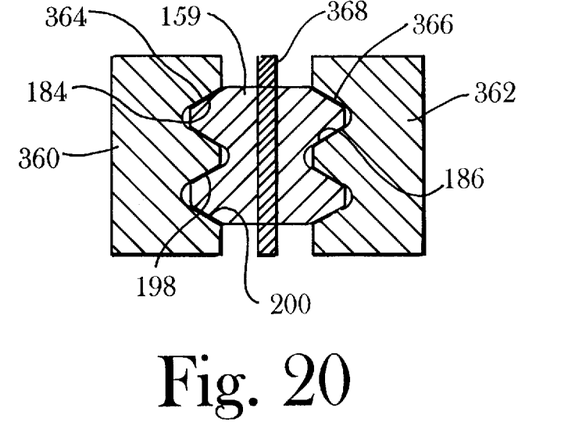
FIG. 20 is a longitudinal cross sectional view illustrative of the linear slide assembly shown in FIG. 19 and having a set of convex compound spin bearings therein.

Referring now lastly to FIGS. 19 and 20, shown thereat is a slide assembly including a linear set of non-recirculating convex compound spin bearings 159 located between a pair of linear rails 360 and 362, each including a plurality of bearing surfaces 364 and 366 (FIG. 20), respectively, for contacting the convex bearing surfaces 184, 186 of the spin bearings 159. A linear carrier member 368 maintains the spin bearings 159 in an aligned position between the rails 360 and 362. Thus, relative movement is facilitated between the rails as shown in FIG. 19.

Having thus shown and described what a present is considered to be the preferred embodiments of the invention, it will readily be appreciated that the spin bearings of the subject invention provide significant advantages over the known prior art. For example, spin bearings are typically much stronger than equivalent sized ball bearings. From another perspective, spin bearings can be made significantly smaller than ball bearings while still retaining the same load carrying capability. This is, in part, because the geometry of spin bearings is such that the races that support the bearings can be made smaller than the races that support comparable ball bearings. Also, spin bearings, particularly concave bearings, can have significantly shorter axial length than ball bearings of equivalent diameters. It is also true that the carrier system for spin bearings is significantly simple and more compact than the carrier system for ball bearings. This is inherent because of the relatively large contact radii that can be realized with spin bearings as compared to ball bearings.

Spin bearings are also typically much stronger than roller and needle bearings. Roller bearings are not four way bearings as are spin bearings and require long axial lengths. Roller and needle bearings can sustain side or radial loads only. They have no effectiveness against axial loads. Needle bearings are primarily used where their thinness is a very important factor in where the loads are relatively low. They represent a design consideration where packaging, particular width, is more important than load bearing capability. Spin bearings, on the other hand, tend to be short and squat. They are not as thin as needle bearings and are much shorter in axial length and thus have inherent caging advantages.

With respect to spherical bearings, they could be thought of as roller bearings which have a rounded contact surface. The term "spherical bearing" comes from the fact that the rounded portion has its own radius which is considerably larger than that of the roll radius. Spherical bearings can rock when the members on each side of the bearing are rocked and twisted back and forth toward each other. Thus, they are very good against brinelling failures which often occur in structures near the extremities of needle and roller bearings. These bearings do provide some limited capabilities as thrust bearings, but they are primarily used against side loads. However, it is impossible for them to form load concentrations anywhere including their extremities. Spin bearings, on the other hand, are as strong or stronger than spherical bearings, and they are much more compact, particularly in axial length. Also, spin bearings are much better as four-way bearings, since they are equally good against axial loads as they are against side or radially loads. Furthermore, spin bearings prevent structural members from rocking and twisting back and forth toward each other so that they are better in stabilizing and positioning the structural members upon which they bear. Additionally, spin bearings are superior to spherical bearings in precision movement operations.

With respect to tapered roller bearings, spin bearings can perform everything that tapered bearings can do, and more, while performing them in a much more simple and direct way. Spin bearings are much simpler and less expensive than tapered roller bearings. Spin bearings are, moreover, relatively more compact for equivalent performance, since the actual length of spin bearings is less than that of tapered roller bearings and because a special tilted bearing race is not required.

Finally, spin bearings are also typically much stronger than crossed-roller bearings, and are much more compact. Crossed-roller bearings mean that every other roller must be tilted at 90° to the one preceding it to achieve a four-way load bearing effect. This is not the case with spin bearings.

Accordingly, it will be obvious that this invention may be varied in many ways. Such variations are not meant to be considered as a departure from the spirit and scope of the invention, and therefore all such modifications, alterations and changes as would be obvious to one skilled in the art as set forth in the appended claims are intended to be included.

I claim:

1. A spin bearing assembly, comprising:

first and second mutually opposing complementary bearing support members having mutually spaced apart bearing support surfaces wherein said first support member includes a carrier access slot for receiving a carrier spring member;

a set of spin bearings located between said bearing support members such that each of said spin bearings is mutually separated and biased towards said second support member by said carrier spring; and wherein said spin bearings include a body having a pair of end faces, a central rotational axis passing through said end faces, a waist region substantially midway between said end faces and having a first thickness dimension, and first and second discrete side surface regions located between said waist region and said end faces and having a second thickness dimension different from said first thickness dimension of said waist region, said first and second side surface regions further having respective curvilinear contact surfaces adapted to provide a plurality of bearing contact points.

2. A spin bearing assembly according to claim 1 wherein said curvilinear contact surfaces of said first and second side surface regions comprise concave or convex contact surfaces.

3. A spin bearing assembly according to claim 2 wherein each of said contact surfaces are arcuate and have a contact radius to a respective bearing contact point which is non-normal to the central rotational axis of said body of the spin bearings.

4. A spin bearing assembly according to claim 3 wherein said first thickness dimension is greater than said second thickness dimension.

5. A spin bearing assembly according to claim 3 wherein said first thickness dimension is less than said second thickness dimension.

6. A spin bearing assembly according to claim 2 and additionally including at least a third and a fourth outer side surface region including arcuate concave or convex contact surfaces located between said end faces and said first and second side surface regions.

7. A spin bearing assembly according to claim 1 wherein one of said bearing support members comprises a drive member and the other of said bearing support members comprises a reaction member.

8. A spin bearing assembly according to claim 1 wherein said bearing support members each include a pair of bearing contact surfaces and wherein said spin bearings contact said bearing contact surfaces.

9. A spin bearing assembly according to claim 1 wherein said first and second bearing support members comprise a pair of mutually parallel bearing races.

10. A spin bearing assembly according to claim 9 wherein said races are circular.

11. A spin bearing assembly according to claim 10 wherein one of said races comprises a rotatable drive member and the other of said races comprises a reaction member.

12. A spin bearing assembly according to claim 9 wherein at least one of said races comprises a linear slide member.

13. A spin bearing assembly according to claim 9 wherein both of said races comprise a pair of rails in a linear slide assembly.

14. A mechanical spin bearing for both thrust and radial loads between two mutually opposing complementary bearing support members, each having at least two spaced apart bearing contact surfaces, comprising:

a bearing body having a pair of end faces;

a central rotational axis passing through said end faces;

a waist region having a first thickness dimension substantially midway between said end faces wherein said waist region includes an annular slot for the passage of a carrier spring member; and first and second discrete side surface regions between the waist region and the end faces and having a second thickness dimension different from said first thickness dimension of said waist region, said first and second surface regions further having respective contact surfaces adapted to provide a plurality of bearing contact points.

15. A spin bearing according to claim 14 wherein said contact surfaces comprise curvilinear contact surfaces.

16. A spin bearing according to claim 15 wherein said curvilinear contact surfaces of said first and second side surfaces comprise arcuate contact surfaces and wherein each of said contact surfaces has a contact radius to a respective bearing contact point of said plurality of bearing contact points which is non-normal to the central rotational axis of the bearing body.

17. A spin bearing according to claim 16 wherein said arcuate contact surfaces are concave with respect to said bearing contact surfaces of said two mutually adjacent members.

18. A spin bearing according to claim 16 wherein said arcuate contact surfaces are convex with respect to said bearing contact surfaces of said two mutually adjacent members.

19. A spin bearing according to claim 16 wherein the first thickness dimension of said waist region is greater than the second thickness dimension of said side surface regions.

* * * * *